United States Patent [19]

Butlin

[11] Patent Number: 4,631,535
[45] Date of Patent: Dec. 23, 1986

[54] SUBMERSIBLE PUMP PRESSURE DETECTION CIRCUIT

[75] Inventor: Duncan M. Butlin, Tulsa, Okla.

[73] Assignee: Hughes Tool Company, Houston, Tex.

[21] Appl. No.: 751,824

[22] Filed: Jul. 5, 1985

[51] Int. Cl.⁴ .............................................. G01L 9/02
[52] U.S. Cl. ............................... 340/856; 340/870.16; 417/63
[58] Field of Search ............ 340/626, 870.04, 870.05, 340/870.16, 870.38, 856, 857; 417/13, 32, 63; 374/128, 172

[56] References Cited

U.S. PATENT DOCUMENTS

| | | | |
|---|---|---|---|
| 2,937,527 | 5/1960 | Mason et al. | 340/856 |
| 3,136,975 | 6/1964 | Kolb | 340/18 |
| 3,284,669 | 11/1966 | Boyd | 340/856 |
| 3,818,207 | 6/1974 | Zschimmer | 235/197 |
| 4,157,535 | 6/1979 | Balkanli | 340/18 CM |
| 4,178,579 | 12/1979 | McGibbeny et al. | 340/856 |
| 4,216,789 | 8/1980 | Hasenbeck | 137/78 D |
| 4,477,230 | 10/1984 | Knox et al. | 417/63 |

Primary Examiner—Deborah L. Kyle
Assistant Examiner—Ted L. Parr
Attorney, Agent, or Firm—James E. Bradley

[57] ABSTRACT

A device for measuring pressure in a submersible well pump motor has features to eliminate the effect of extraneous DC in the ground path. A potentiometer located downhole has a resistor engaged by a wiper which moves along the resistor in response to pressure change. An upper resistor above the potentiometer resistor connects to the transmission line that leads to the surface. A lower resistor below the wiper travel connects the potentiometer resistor to ground. A first zener diode is connected to the wiper between the wiper and ground. A second zener diode having a greater breakdown voltage, is connected to the transmission line above the upper resistor and to ground. Current is gradually increased at the surface from zero to a maximum level, then repeated. Voltages are measured, with the slopes changing as the zener diodes begin to conduct. The values measured can be used to compute the actual position of the wiper on the potentiometer resistor.

4 Claims, 2 Drawing Figures

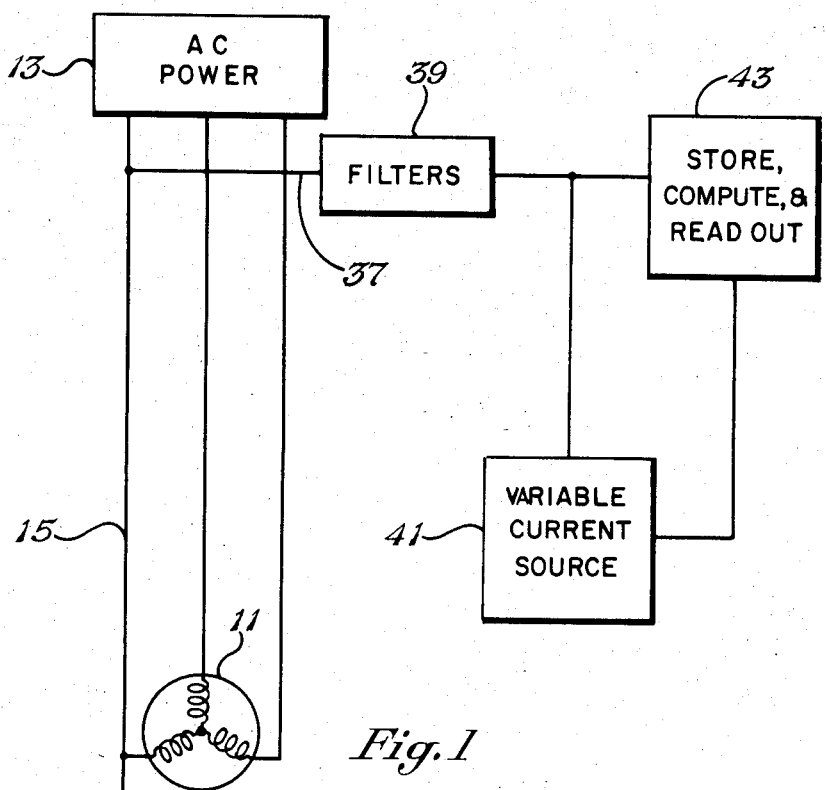
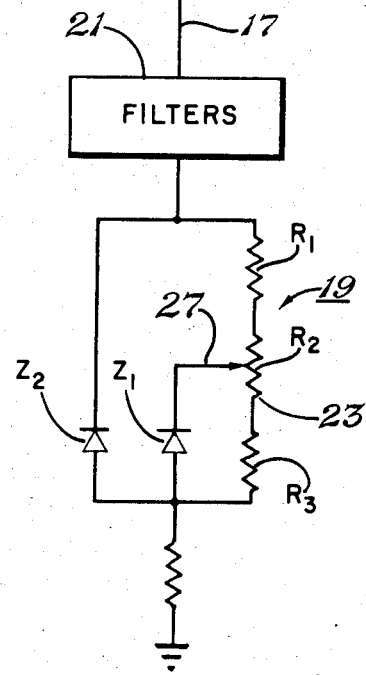
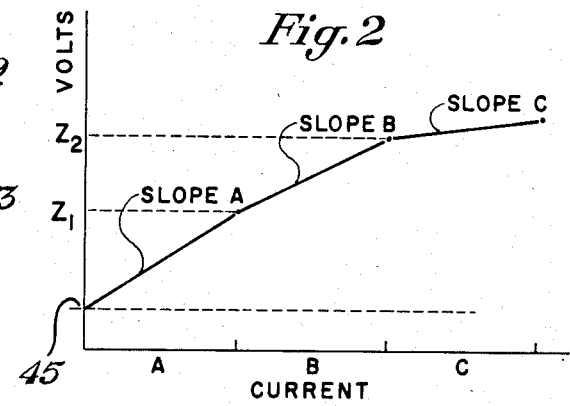
*Fig. 1*
*Fig. 2*

SUBMERSIBLE PUMP PRESSURE DETECTION CIRCUIT

BACKGROUND OF THE INVENTION

1. Field of the Invention

This invention relates in general to the measurement of pressure in a downhole submersible pump, and in particular to circuitry for compensating for DC currents in the ground.

2. Description of the Prior Art

In a submersible pump assembly, a large AC motor is located downhole for driving a centrifugal pump. AC power is supplied over three conductors extending from the surface.

Some systems employ means for detecting the pressure in the vicinity of the motor. Normally, this includes a pressure sensor located in the motor lubricant, the lubricant being at the ambient pressure in the well. The sensor is connected to a potentiometer. DC voltage is applied from the surface and superimposed on the AC lines. Filters at the surface and downhole filter out the AC. The DC voltage flows through the potentiometer which has a resistance that varies correspondingly to the pressure change.

DC currents in the ground return path can cause erroneous readings. Cathodic protection used in some wells can create the extraneous DC currents in the ground return path which effect the pressure measurement.

SUMMARY OF THE INVENTION

In this invention, circuitry is provided for eliminating the effects of DC currents in the ground return path. The downhole potentiometer has its wiper connected to ground through a blocking means for blocking current flow until a selected level is reached. Preferably, the blocking means comprises a zener diode, which has a breakdown voltage at which it will conduct to ground. A second blocking means is connected above the potentiometer resistor and to ground, bypassing the potentiometer resistor. The second blocking means is another zener diode, having a higher breakdown voltage.

At the surface, the current is ramped up slowly. Up to a selected minimum level, the current will flow through the potentiometer to ground, being blocked by both zener diodes from bypassing any portion of the potentiometer. The voltage measured at the surface is proportional to the cable and potentiometer total resistance. As the current increases, the first zener diode will reach its breakdown point and begin to conduct. At this point, the voltage increase at the surface will be proportional to the cable resistance, and the portion of the potentiometer resistor above the wiper. As the current continues to increase, the second diode will conduct once its breakdown voltage is reached. At this point, the voltage increase at the surface will be proportional to the resistance of the cable. The voltage measurements are retained at the surface and are used to compute the actual position of the wiper on the potentiometer, thereby providing an indication of pressure uninfluenced by DC currents in the ground return path.

BRIEF DESCRIPTION OF THE DRAWINGS

FIG. 1 illustrates a submersible pump system having a pressure detection circuit constructed in accordance with this invention.

FIG. 2 is a graph of voltage versus current measured at the surface as the current is ramped up.

DESCRIPTION OF THE PREFERRED EMBODIMENT

Referring to FIG. 1, the submersible pump system includes a downhole AC electrical motor 11, which drives a centrifugal pump (not shown). The motor 11 is connected to an AC power source 13 by three conductor cables 15. For measuring pressure, a line 17 extends from one of the conductors 15 to a pressure measuring device 19. Filters 21 block the AC power from the pressure measuring device 19. The pressure measuring device 19 includes a potentiometer 23. Potentiometer 23 has a potentiometer resistor $R_2$. The potentiometer 23 has a wiper 27 that moves along the potentiometer resistor $R_2$ corresponding to changes in pressure. Wiper 27 is moved physically by a pressure sensor (not shown) of a conventional type. Wiper 27 is connected through a zener diode $Z_1$ to ground.

Potentiometer resistor $R_2$ has an upper resistor portion $R_1$ that is fixed. This may be a portion of the potentiometer resistor $R_2$ above the upper limit of travel of wiper 27, or it may be a separate resistor, as indicated in the drawing. Similarly, there is a lower resistor portion $R_3$ extending downwardly. The wiper 27 travel will not extend to this portion, and it is shown as a separate fixed resistor. Resistor $R_1$ is connected to the filters 21 and the line 17. Resistor $R_3$ is connected to ground.

A second zener diode $Z_2$ is connected to ground and to the line 17 between resistor $R_1$ and filters 21. Zener diode $Z_2$ has a greater breakdown voltage than zener diode $Z_1$. The zener diodes $Z_1$ and $Z_2$ serve as blocking means for blocking current flow until a selected voltage level is reached.

At the surface, a line 37 is connected to a power conductor 15. Filters 39 block the AC current, and allow the DC current to pass. A variable current source 41, which is capable of slowly ramping current up to a selected level, then repeating, is connected to the line 37 on the other side of the filters 39. A controller 43 is connected to the current source 41 and to the line 37. The controller 43 serves to measure and retain voltage values as the current slowly ramps upward, to compute pressure from these measurements, and to provide a readout.

The resistances of the upper and lower resistors $R_1$ and $R_3$ and the potentiometer resistor $R_2$ are preferably identical. In operation, in the low level current range (Range A), say from 0 to 5 milliamps, the zener diodes $Z_1$ and $Z_2$ will not conduct. The current will flow through resistors $R_1$, $R_2$ and $R_3$. There is also a transmission line resistance $R_0$ which includes the resistance of cable 15, lines 17 and 37 and any DC offset in the ground path. The voltage slope measurement at the surface will be proportional to the total resistance $R_a$, which is as follows:

$$R_a = R_0 + R_1 + R_2 + R_3$$

Since $R_1 = R_2 = R_3 = R$; then $$R_1 + R_2 + R_3 = 3R; \text{ therefore}$$

$$R_0 + 3R = R_a$$

$$R = (R_a - R_0)/3$$

$R_a$ is a computed value at the surface equal to the voltage divided by current during Range A. $R_0$ is not known yet.

FIG. 2 illustrates the slope of the voltage versus current during the Range A. Voltage readings will be taken by controller 43 at small increments along Slope A, to provide an average resistance $R_a$, which is retained in the memory of controller 43.

As the current continues to ramp upward to the mid-level range (Range B), then the first zener diode $Z_1$ will begin to conduct. Resistor $R_3$ and the portion of the potentiometer resistor $R_2$ below wiper 27 will have reached a limiting voltage drop. Because of current flow through zener diode $Z_1$, further current increase will have no effect on the voltage drop through these resistances. Assuming X is the distance from the wiper 27 to the top of the potentiometer resistor 23, the resistance measurement $R_b$ during Range B will thus be:

$$R_b = R_0 + R_1 + XR_2 = R_0 + R + XR$$

Consequently, $X = (R_b - R_0 - R)/R$ $R_b$ is the computed value at the surface during Range B. Voltage readings are taken by controller 43 at small increments and divided into the current levels to compute an average $R_b$. As shown in FIG. 2, the Slope B and thus the resistance $R_b$ is different from $R_a$. The value $R_b$ is retained in the memory of controller 43.

The current continues to increase into Range C, as indicated in FIG. 2, and the second zener diode $Z_3$ will begin to conduct. When it conducts, all of the resistors $R_1$, $R_2$, and $R_3$ will have reached a limiting voltage drop, where any further current increase will have no effect on this voltage drop. The resistance slope computed at the surface for this Range C will thus be proportional only to $R_0$. By measuring voltage at increments along Slope C in FIG. 2, an average value of $R_0$ can be computed.

The third level thus provides the value for $R_0$, which is the effective resistance of the cable, including any offset for extraneous DC voltage in the ground path. Line 45 in FIG. 2 represents a typical DC offset due to cathodic protection circuits. Once $R_0$ is known, R can be calculated from the equation derived for Range A. Then X can be calculated from the equation derived for Range B. X is an actual distance of travel along the potentiometer and thus directly relates to the pressure.

During the operation, the variable current source 41 will be controlled by the controller 43 for ramping the current through the low level Range A, mid level Range B, and upper level Range C. The controller 43 will measure the voltage at increments each level, store the values, then make the computation to solve for X, as previously explained. The value X can be displayed through scaling circuits and a readout, and also recorded. Preferably several hundred readings are taken during each range. The ramp up cycle preferably takes several minutes.

The invention has significant advantages. The system avoids interference and inaccuracy problems introduced by extraneous DC currents in the ground return, such as from cathodic protection systems. Resistance offsets due to DC current path resistance between the current source and the potentiometer will be accommodated. The potentiometer resistance measurement is ratiometric. Thus the absolute resistance does not effect the accuracy of the X measurement as a proportion of R. If the potentiometer temperature remains the same throughout the ramping, the resistance changes due to temperature effects will null.

While the invention has been shown in only one of its forms, it should be apparent to those skilled in the art that it is not so limited but is susceptible to various changes without departing from the scope of the invention. For example, a similar circuit can be located above the circuit shown. The upper circuit would have zener diodes with breakdown voltages higher than the zener diodes of the lower circuit, so as to operate above Range C currents. The upper circuit could be used for measuring another characteristic, such as temperature.

I claim:

1. In a submersible well pump system having a downhole electrical motor for driving the pump, an improved means for measuring a fluid property in the environment of the well, comprising in combination:

a downhole potentiometer having a resistor connected to a transmission line linked to the surface and engaged by a wiper connected to ground, the wiper being movable along the resistor in response to changes in the fluid property;

a first downhole blocking means connected to the wiper between the wiper and ground for blocking current flow until a selected power level B is reached;

a second downhole blocking means connected to the transmission line above the resistor and to ground for blocking current flow until a selected power level C is reached that is greater than the power level B;

means at the surface for providing a power level A, which is below power levels B and C, to the transmission line, providing current which passes through the resistor to ground and is blocked by the first blocking means, for providing the power level B to the transmission line, providing current which passes through the upper portion of the resistor above the wiper and through the first blocking means to ground, and for providing the power level C which passes through the second blocking means to ground; and means at the surface for monitoring the voltage and current at the surface during each of the power levels, and for computing with the monitored voltage and current, the position of the wiper on the potentiometer resistor.

2. In a submersible well pump system having a downhole electrical motor for driving the pump, an improved means for measuring pressure in the environment of the motor, comprising:

a downhole potentiometer having a potentiometer resistor engaged by a wiper connected to ground, the wiper being movable along the potentiometer resistor in response to pressure change;

an upper resistor located downhole above the upper limit of travel of the wiper;

the upper resistor being connected to the potentiometer resistor and into a transmission line that is linked to the surface;

a lower resistor located downhole below the lower limit of travel of the wiper, the lower resistor being connected to the potentiometer resistor and to ground;

blocking means connected to the wiper between the wiper and ground for blocking current flow until a selected voltage breakdown is reached;

a second blocking means connected to the transmission line above the upper resistor and to ground, for blocking current flow until a selected voltage breakdown is reached that is greater than the voltage breakdown of the first blocking means;

means at the surface for increasing current through the transmission line through a low level, mid level, and high level, then repeating the cycle, the low level current being blocked by the first and second blocking means, the mid level current being blocked by the second blocking means, but passing through the first blocking means, the third level current passing through the first and second blocking means to ground; and means at the surface for monitoring the voltage at each current level and for computing with the voltages and currents monitored from the three current levels the position of the wiper on the potentiometer, providing a value proportional to the pressure in the environment of the motor.

3. In a submersible well pump system of the type having a downhole electrical motor for driving the pump, an improved means for measuring pressure in the environment of the motor, comprising:

a potentiometer having a potentiometer resistor engaged by a wiper connected to ground, the wiper being movable along the potentiometer resistor in response to pressure changes;

an upper resistor located above the upper limit of travel of the wiper connected to the potentiometer resistor and into a transmission line linked to the surface;

a lower resistor located below the lower limit of travel of the wiper, connected to the potentiometer resistor and into a line extending to ground;

a first zener diode connected to the wiper between the wiper and ground;

a second zener diode connected to the transmission line above the upper resistor and to ground, the second zener diode having a higher breakdown voltage than the first zener diode;

means at the surface for supplying an increasing ramp of DC current to the transmission line to a selected level, then repeating the cycle, with the voltage measured up to the point at which the first zener diode conducts providing a slope proportional to the transmission line resistance plus the upper, lower, and potentiometer resistor resistances, with the voltage measured between the point at which the first zener diode conducts and the second zener diode conducts providing a slope proportional to the transmission line resistance plus the upper and the potentiometer resistor resistances above the wiper, and the voltage above the point at which the second zener diode conducts providing a slope proportional to the transmission line resistance; and means for computing with the slopes determined, the position of the wiper on the potentiometer resistor.

4. A method for measuring a fluid property in the environment of a downhole motor of a submersible well pump, comprising in combination:

providing a potentiometer downhole with a potentiometer resistor and a wiper connected to ground, the wiper being movable on the potentiometer resistor in response to the fluid property change;

providing an upper resistor above the upper limit of travel of the wiper, and connecting it to the potentiometer resistor and to a transmission line linked to the surface;

providing a lower resistor below the lower limit of travel of the wiper, connecting it to ground and to the potentiometer resistor;

providing a first blocking means between the wiper and ground for enabling current to flow through the wiper only when a selected voltage breakdown level is reached;

providing a second blocking means downhole and connecting it between ground and to a point above the upper resistor, for allowing current to flow through the second blocking means only when a selected voltage breakdown is reached that is above the voltage breakdown of the first blocking means;

increasing the current at the surface on the transmission line to a selected maximum level, then repeating the cycle;

measuring the voltage at selected increment as the current increases, with the voltage providing a first slope up to the point at which the first blocking means conducts, a second slope up to the point at which the second blocking means conducts, and a third slope while both blocking means are conducting; and computing with the slopes the position of the wiper of the potentiometer resistor.

* * * * *